US012571431B2

(12) United States Patent
Gurvich et al.

(10) Patent No.: US 12,571,431 B2
(45) Date of Patent: Mar. 10, 2026

(54) FLEXIBLE METALLIC COUPLINGS FOR DRIVE SHAFTS

(71) Applicant: Goodrich Corporation, Charlotte, NC (US)

(72) Inventors: Mark R. Gurvich, Middletown, CT (US); Jeffrey L. Mathis, Rome, NY (US); Joyel M. Schaefer, Earlville, NY (US); Michael J. King, Sauquoit, NY (US); Brayton Reed, New York Mills, NY (US)

(73) Assignee: Goodrich Corporation, Charlotte, NC (US)

( * ) Notice: Subject to any disclaimer, the term of this patent is extended or adjusted under 35 U.S.C. 154(b) by 449 days.

(21) Appl. No.: 18/096,900

(22) Filed: Jan. 13, 2023

(65) Prior Publication Data

US 2024/0240675 A1 Jul. 18, 2024

(51) Int. Cl.
*F16D 3/10* (2006.01)
*F16D 3/06* (2006.01)
*F16D 3/60* (2006.01)

(52) U.S. Cl.
CPC ................. *F16D 3/10* (2013.01); *F16D 3/06* (2013.01); *F16D 3/60* (2013.01); *F16D 2250/00* (2013.01)

(58) Field of Classification Search
CPC ..... F16D 3/10; F16D 3/06; F16D 3/60; F16D 2250/00
USPC .......................................................... 464/69
See application file for complete search history.

(56) References Cited

U.S. PATENT DOCUMENTS

| | | | |
|---|---|---|---|
| 3,521,465 A | 7/1970 | Bossler | |
| 3,685,314 A | 8/1972 | Flannelly | |
| 4,116,018 A * | 9/1978 | Weible | F16D 3/60 |
| 4,661,084 A * | 4/1987 | Federn | F16D 3/60 |
| | | | 464/69 |
| 5,167,582 A | 12/1992 | Hunt | |
| 6,287,207 B1 * | 9/2001 | Rui | F16D 3/72 |
| 2006/0281566 A1 | 12/2006 | Lee | |

FOREIGN PATENT DOCUMENTS

| | | |
|---|---|---|
| CN | 110486388 A | 11/2019 |
| JP | H02138521 A | 5/1990 |
| WO | 2022/136214 A1 | 6/2022 |

OTHER PUBLICATIONS

Extended European Search Report for EP Application No. 24151660. 8, Dated May 23, 2024, pp. 6.

* cited by examiner

*Primary Examiner* — Greg Binda
(74) *Attorney, Agent, or Firm* — Kinney & Lange, P.A.

(57) ABSTRACT

A flexible coupling includes a first flange and a second flange, wherein in a relaxed state the first flange and the second flange are each aligned along a longitudinal axis. A plurality of first coupling members extends from the first flange. Each first coupling member includes a first and second driving beam meeting at a first node to form a topologically triangular truss. A plurality of second coupling members extend from the second flange. Each second coupling member includes a first and second driven beam extending from the second flange and meeting at a second node to form a topologically triangular truss. The first node of each of the first coupling members is connected to the second node of a respective one of the second coupling members.

20 Claims, 11 Drawing Sheets

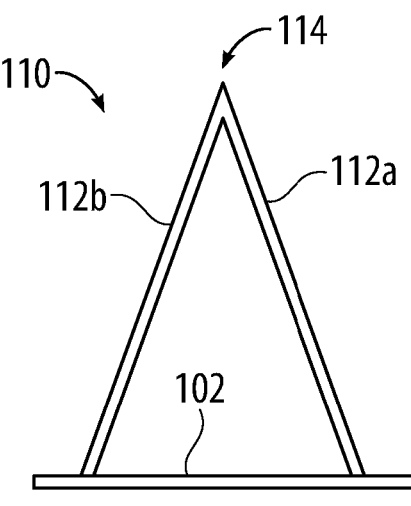
FIG. 12A
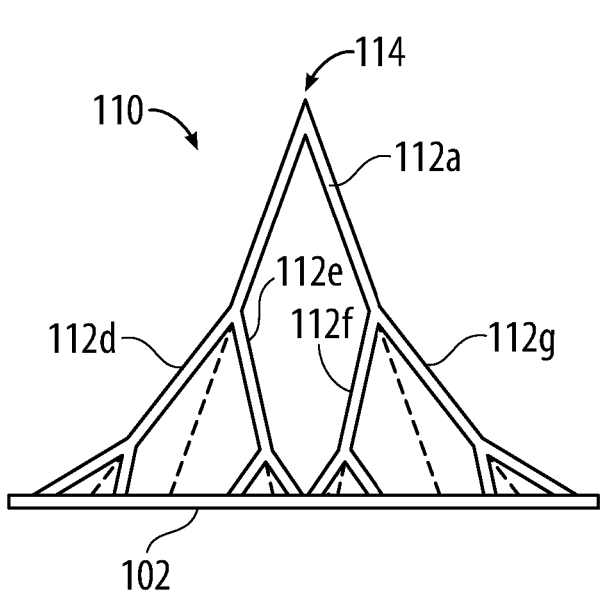
FIG. 12B
FIG. 12C

FLEXIBLE METALLIC COUPLINGS FOR DRIVE SHAFTS

BACKGROUND

1. Field

The present disclosure relates to mechanical couplings, and more particularly to flexible couplings for drive shafts, such as used in aircraft and rotorcraft applications.

2. Description of Related Art

Among other structural requirements, drive shafts have to provide two seemingly conflicting structural responses, namely, to be stiff and strong under torque, but also to be flexible under axial and bending deformations. Such flexibility is needed to compensate for inevitable lateral and axial movements of shafts during service and/or to take into account potential imperfections of shaft installations. Current methods to resolve this dilemma are usually resolved by flexible couplings, installed at both ends of a cylindrical drive shaft body. For example, some designs successfully use disk-type metallic couplings. These couplings provide necessary structural performance for many aircraft torque-transferring applications but are relatively expensive due to requirements of high-precision fabrication and high-quality welding.

The conventional techniques have been considered satisfactory for their intended purpose. However, there is an ever present need for improved systems and methods for flexible couplings and making the same, such as for a broad range of aircraft drive shafts. This disclosure provides a solution of design and method of making for this need.

SUMMARY

A flexible coupling includes a first flange of a first shaft. A second flange of a second shaft is included, wherein in a relaxed state the first flange and the second flange are each aligned along a longitudinal axis. A plurality of first coupling members extends from the first flange. Each first coupling member includes a first driving beam extending from the first flange and a second driving beam extending from the first flange and meeting the first driving beam at a first node to form a topologically triangular truss. A plurality of second coupling members extends from the second flange. Each second coupling member includes a first driven beam extending from the second flange and a second driven beam extending from the second flange and meeting the first driven beam at a second node to form a topologically triangular truss. The first node of each of the first coupling members is connected to the second node of a respective one of the second coupling members.

Each of the first and second driven beams of the plurality of first coupling members can have a width in a circumferential direction relative to the longitudinal axis. Each of the first and second driven beams of the plurality of first coupling members can have a thickness in a radial direction with respect to the longitudinal axis. Each of the first and second driving beams of the plurality of second coupling members can have the width in the circumferential direction. Each of the first and second driving beams of the plurality of second coupling members can have the thickness in the radial direction. The width can be greater than the thickness for flexibility under bending.

Each of the first driving beams and second driving beams of the plurality of first coupling members, and each of the first driven beams and second driven beams of the plurality of second coupling members can extend radially outward beyond the first and second flanges relative to the longitudinal axis. Each of the first driving beams and second driving beams of the plurality of first coupling members, and each of the first driven beams and second driven beams of the plurality of second coupling members can extend radially inward within an outer extent of the first and second flanges relative to the longitudinal axis. There need be no hoop member extending in a circumferential direction with respect to the longitudinal axis to connect the first nodes.

The plurality of first coupling members can include three or more first couplings. The plurality of second coupling members can include three or more of second couplings. The number of first couplings can equal the number of second couplings Each of the first driving beams and second driving beams of the plurality of first coupling members, and each of the first driven beams and second driven beams of the plurality of second coupling members can follow a straight line, can follow a curved profile that is concave relative to the longitudinal axis, can follow a curved profile that is convex relative to the longitudinal axis, or can follow a profile that has any combination of concave, convex, or straight portions relative to the longitudinal axis.

The first driving beams and second driving beams of the plurality of first coupling members, and the first driven beams, and second driven beams of the plurality of second coupling members can have a constant cross-sectional profile along their own respective lengths, or a variable cross-sectional profile along their own respective lengths. Each of the first driving beams and second driving beams of the plurality of first coupling members, can be connected with a respective reinforcing member to the first flange, and wherein each of the first driven beams and the second driven beams of the plurality of second coupling members can be connected with a respective reinforcing member to the second flange. Each of the first driving beams and second driving beams of the plurality of first coupling members can connect to the first flange through a respective branching base, and each of the first driven beams and second driven beams of the plurality of second coupling members can connect to the second flange through a respective branching base.

A method of additively manufacturing a flexible coupling is provided, for making any flexible coupling as described above. The method can include forming the first flange starting from a build plate and proceeding in a layer-by-layer additive process in a build direction away from the build plate along the longitudinal axis, after forming the first flange, forming the plurality of first coupling members starting from the first flange and proceeding in a layer-by-layer additive process in the build direction, after forming the plurality of first coupling members, forming the plurality of second coupling members, starting from the first nodes and proceeding in a layer-by-layer process in the build direction, and after forming the plurality of second coupling members, forming the second flange beginning from the second coupling members and proceeding in a layer-by-layer process in the build direction.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIGS. 12A, 12B, and 12C are schematic side elevation views of one of the coupling members of FIG. 1, showing three different respective levels of branching for connection of the coupling members to the respective flanges.

DETAILED DESCRIPTION OF THE PREFERRED EMBODIMENTS

Figure 1:
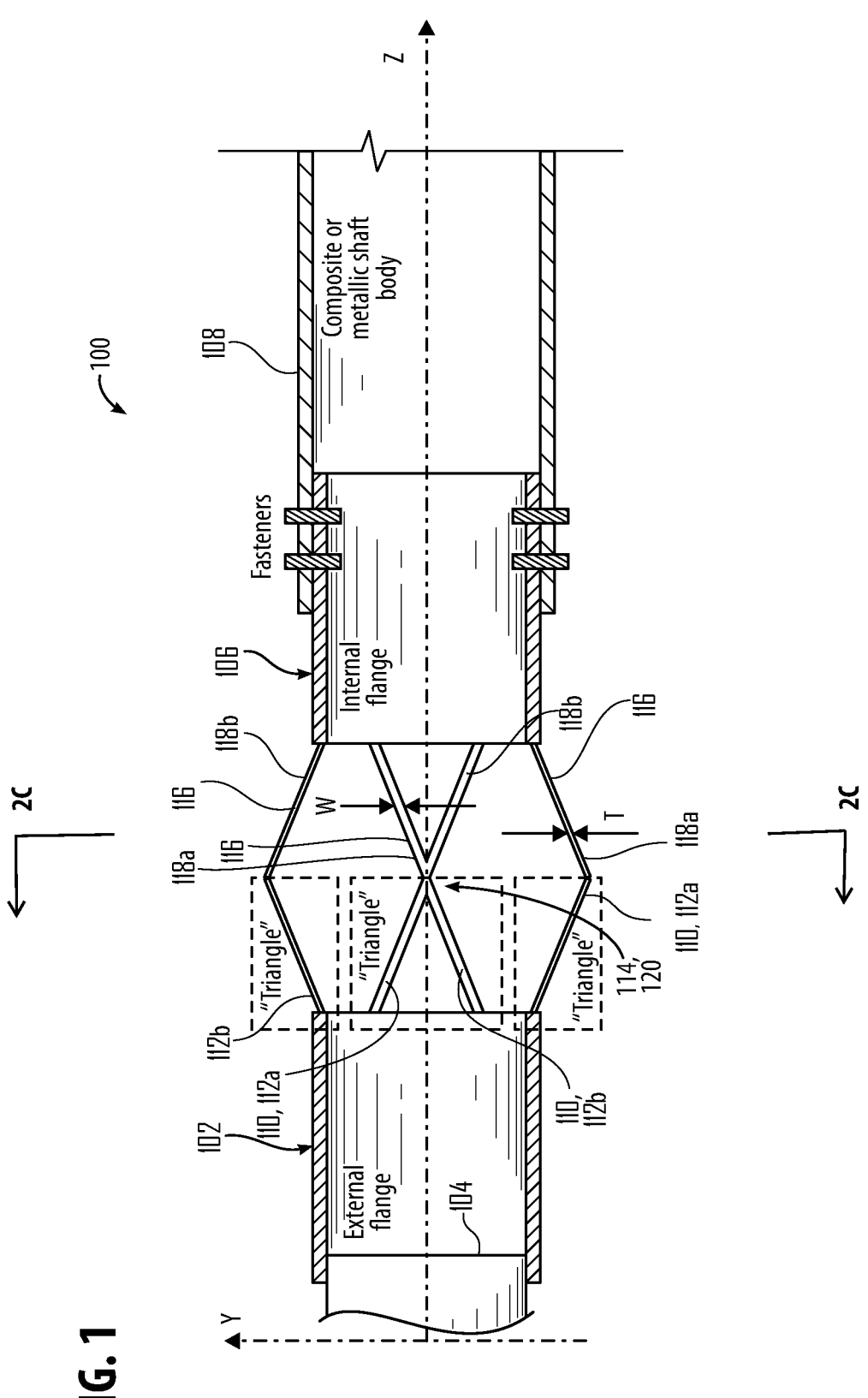
FIG. 1 is a schematic axial cross-sectional side elevation view of an embodiment of a flexible coupling constructed in accordance with the present disclosure, showing the first and second flanges connected by coupling members.

Reference will now be made to the drawings wherein like reference numerals identify similar structural features or aspects of the subject disclosure. For purposes of explanation and illustration, and not limitation, a partial view of an embodiment of a flexible coupling in accordance with the disclosure is shown in FIG. 1 and is designated generally by reference character 100. Other embodiments of systems in accordance with the disclosure, or aspects thereof, are provided in FIGS. 2A-13D, as will be described. The systems and methods described herein can be used to provide flexibility under bending, compression, and tension for flexible couplings, while still providing stiffness under torsion.

The flexible coupling 100 includes first flange 102, e.g., a cylindrical metallic part also referred to as an external flange, e.g., because it is fastened outside of a drive shaft 108. Shaft 108 can be either metallic or composite, and different variants of fasteners, typically used for similar metallic/metallic or metallic/composite joints, can be applied. A second flange 106, e.g., another cylindrical part also referred to as an internal flange is similarly fastened inside of a second drive shaft 104 or a load-transferring device such as a gear box, engine, or the like.

In a relaxed state as shown in FIG. 1, the first flange 102 and the second flange 106 are each aligned along on longitudinal axis Z. A plurality of first coupling members 110 extends from an end of the first flange 102. Each first coupling member 110 includes a first driving beam 112 $a$ extending from the first flange 102 and a second driving beam 112 $b$ extending from the first flange 102 and meeting the first driving beam at a first node 114 to form a topologically triangular truss. These triangular trusses can be flat (as illustrated in FIG. 1) or curved (as illustrated in FIGS. 7A-7C and FIGS. 11A-11B) making then quasi-triangular for non-flat profiles. Only one of the triangular trusses of the first coupling members 110 is fully shown in FIG. 1, but see FIG. 2C, where many, e.g., four, of the triangular trusses are shown more fully.

A plurality of second coupling members 116 extend from the second flange 106. Each second coupling member 116 includes a first driven beam 118a extending from the second flange 106, and a second driven beam 118b extending from the second flange 106 and meeting the first driven beam at a second node 120 to form a triangular truss, similar to the triangular trusses of the coupling members 110 described above. The first node 114 of each of the first coupling members 110 is connected to the second node 120 of a respective one of the second coupling members 116, i.e., the points of triangular trusses from the first flange 102 connect to the respective points of the triangular trusses from the second flange 106.

Each of the beams 112a, 112b, 118a, 118b has a width W in a circumferential direction relative to the longitudinal axis Z, and a thickness T in a radial direction with respect to the longitudinal axis Z. The width W is greater than the thickness T for flexibility of the individual beams under bending.

Figures 2A, 2B, 2C:
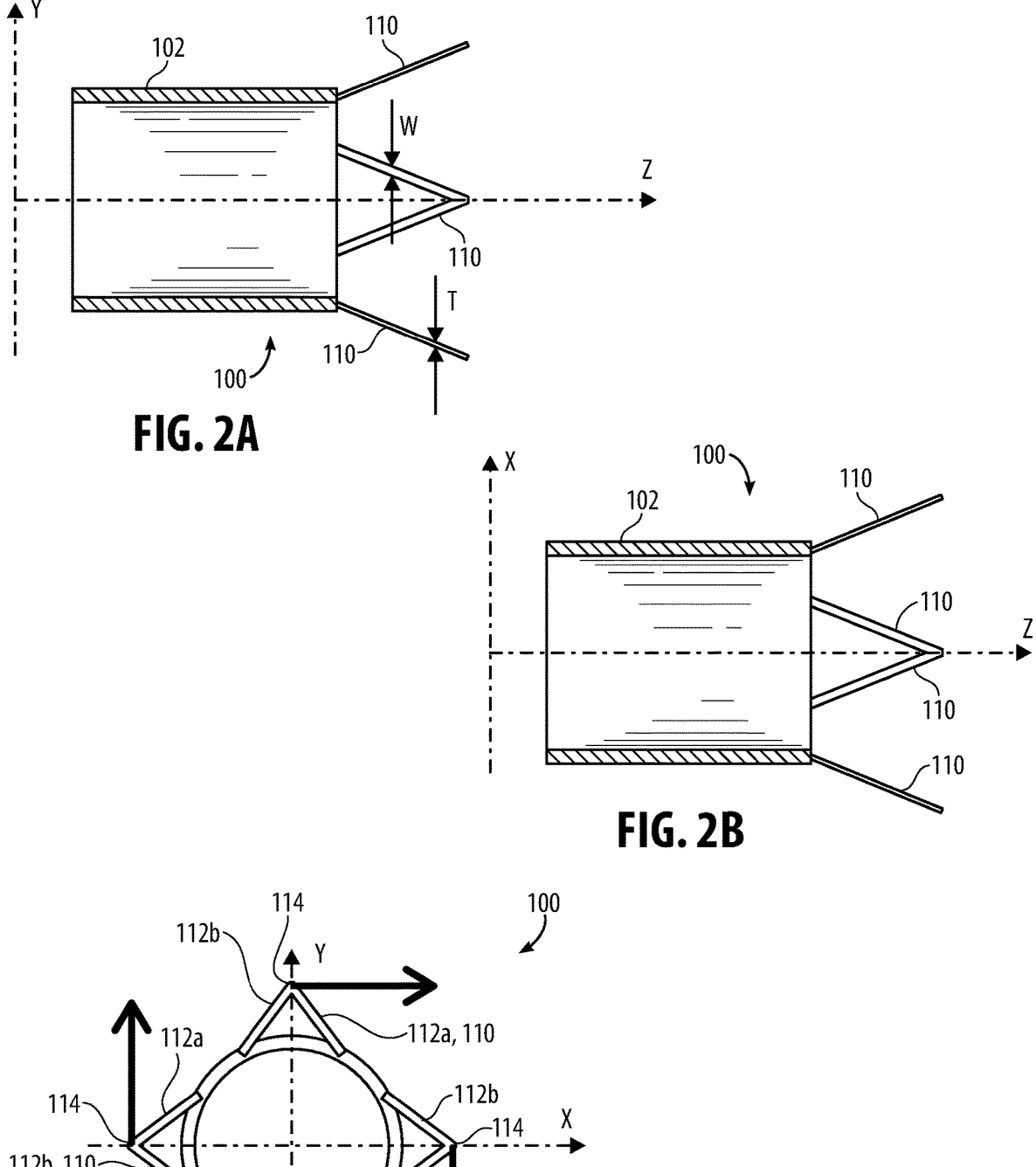
FIGS. 2A and 2B, are axial and 2C is diametrical schematic cross-sectional side elevation, respectively, of a portion of the flexible coupling of FIG. 1, with arrows indicating load components due to torque in FIG. 2C.

With reference now to FIGS. 2A-2C, a portion of the flexible coupling 100 with the first flange 102 and first coupling members 110 from the side and top, respectively, as indicated by the X- and Y-axes in FIGS. 2A and 2B. FIG. 2C shows a diametrical end view of the same portion of the flexible coupling 100 as in FIGS. 2A and 2B, wherein the large arrows indicate reactions due to torsional load acting on the nodes 114, 120 (which also are resolved in the coupling members 116 of FIG. 1).

Figures 3, 4:
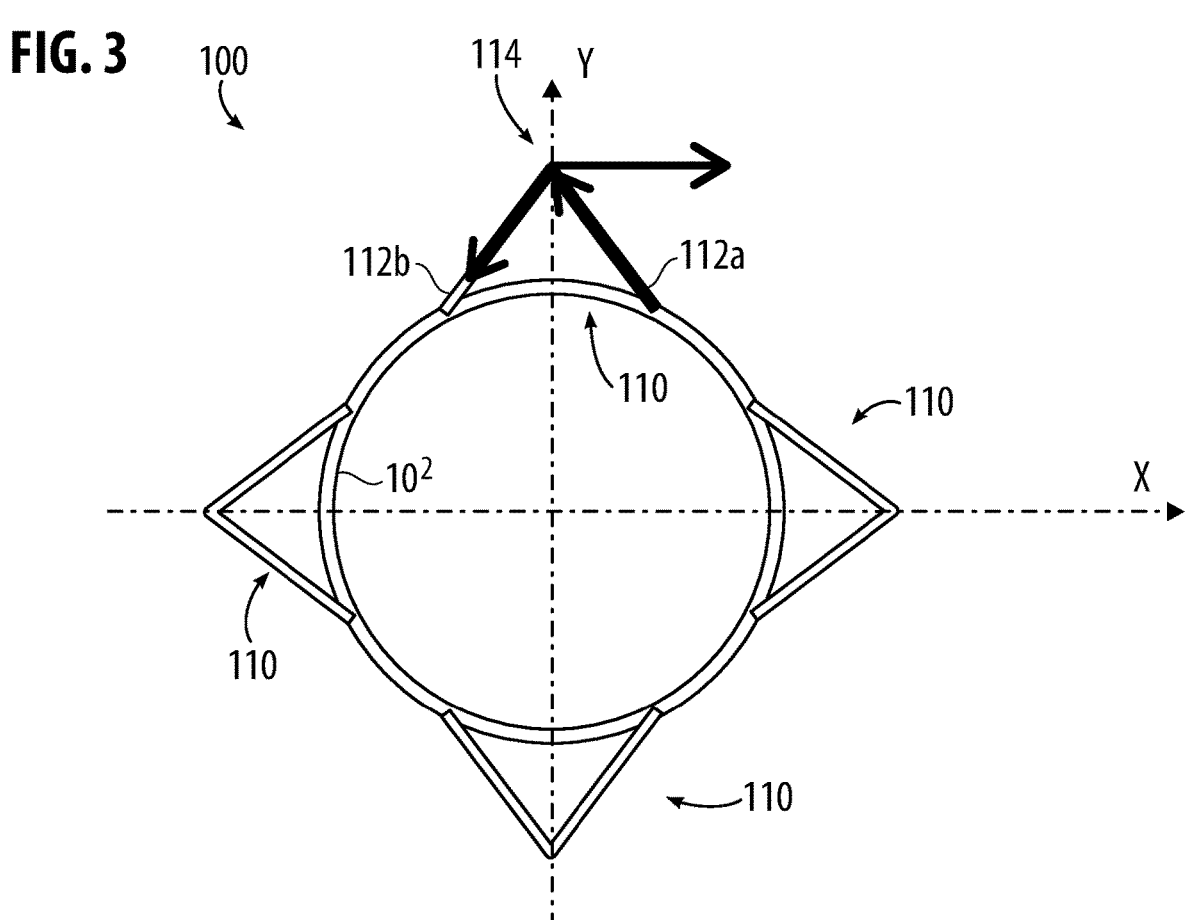
FIG. 3 is a schematic diametrical cross-sectional end view of the portion of the flexible coupling of FIG. 2C, showing load transfer by force arrows from torque induced load (shown as example for one pair of beams only)
FIG. 4 is a schematic axial cross-sectional side elevation view of the portion of the flexible coupling of FIG. 2A, schematically indicating deformation of the flexible coupling under axial compression.

FIG. 3 illustrates how the torsional load and corresponding reactions are balanced by axial forces in the individual beams 112a, 112b of the triangular coupling members 110, as indicated by the large arrows along these beams 112a, 112*b*. Those skilled in the art will readily appreciate that similar forces develop on the beams 118*a*, 118*b* of FIG. 1 as well.

Figure 5:
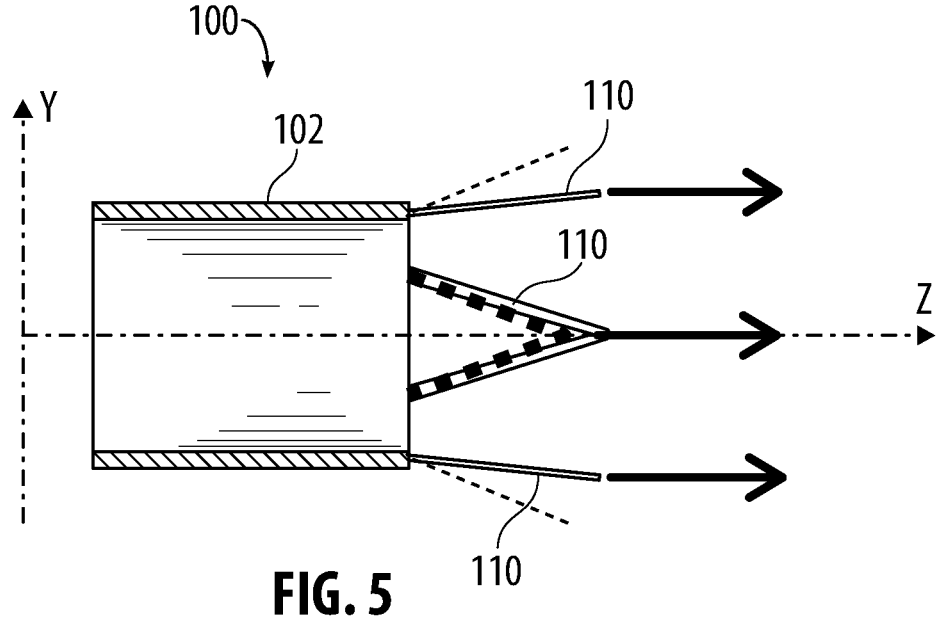
FIG. 5 is a schematic axial cross-sectional side elevation view of the portion of the flexible coupling of FIG. 2A, schematically indicating deformation of the flexible coupling under axial tension.
Figure 6:
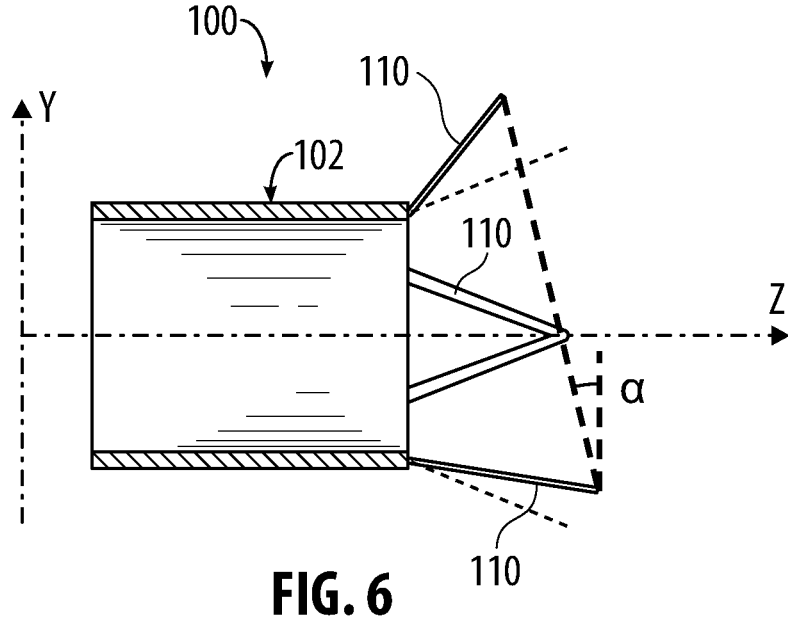
FIG. 6 is a schematic axial cross-sectional side elevation view of the portion of the flexible coupling of FIG. 2A, schematically indicating deformation of the flexible coupling under angular deformation, e.g., due to bending.

With respect now to FIGS. 4-6, flexibility of the coupling members 110 is shown schematically, which those skilled in the art will readily appreciate that it can similarly be applied to the coupling members 116 of FIG. 1. FIG. 4 shows axial deformation under compression, where the compression load is represented by forces as large arrows parallel to the longitudinal axis Z. Here, the coupling members 110 in their deflected state are shown in solid lines, whereas their relaxed, undeflected state is indicated with broken lines.

Similarly, FIG. 5 shows axial deformation under tension, where the tension load is represented by forces as large arrows parallel to the longitudinal axis Z. Here, the coupling members 110 in their deflected state are shown in solid lines, whereas their relaxed, undeflected state is indicated with broken lines.

FIG. 6 shows flexibility under bending, presented for example as in angular deformation, with angle α indicating the angular deflection from the relaxed or undeflected state. Here, the coupling members 110 in their deflected state are shown in solid lines, whereas their relaxed, undeflected state is indicated with broken lines. The deflections indicated in FIGS. 4-6 are accommodated by the relatively thin thickness T of the beams 112*a*, 112*b*, 118*a*, 118*b* in comparison with their width W, as indicated in FIG. 1. In other words, the high aspect ratio of width versus thickness W:T of the 112*a*, 112*b*, 118*a*, 118*b* allows for the flexible deformations shown in FIGS. 3-6. There is no hoop member extending in a circumferential direction with respect to the longitudinal axis Z to connect the nodes 114, so the four nodes 114 can expand and contract in the radial direction as needed.

As shown in FIG. 1, each of the beams 112*a*, 112*b*, 118*a*, 118*b* extends radially outward beyond the first and second flanges 102, 106 relative to the longitudinal axis Z. The first coupling members 110 diverge radially outward in a direction going away from the first flange 102 along the longitudinal axis z, i.e., they get wider in the direction going to the left as oriented in FIG. 1. The second coupling members 116 converge radially inward from the first nodes 114 to the second flange 106 in a direction going toward the second flange 106 along the longitudinal axis Z, i.e., they get narrower in the direction going to the left as oriented in FIG. 1. In other words, the mid-planes of the triangular trusses are oriented on a non-zero angle with respect to the axial direction defined by the longitudinal axis Z.

Figure 7A:
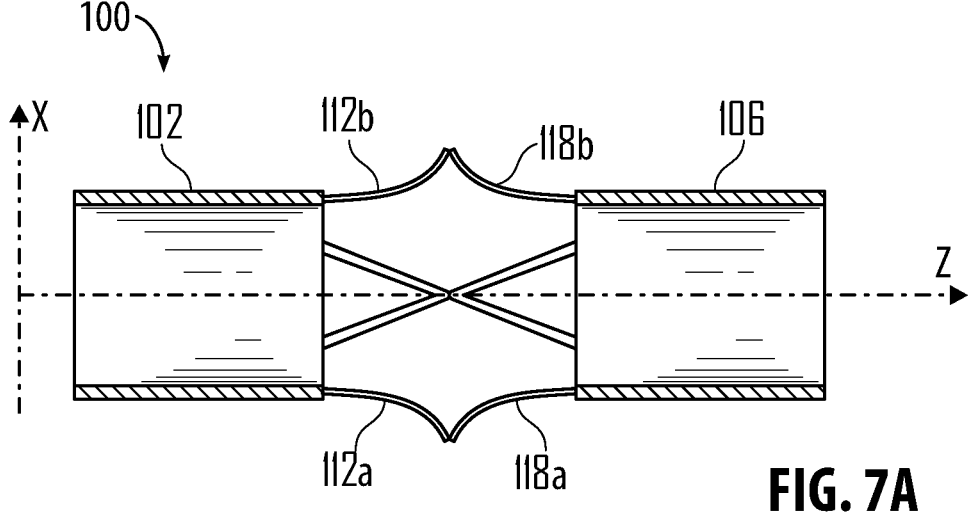
FIGS. 7A, 7B, and 7C are schematic axial cross-sectional side elevation views of an embodiment of a flexible coupling constructed in accordance with the present disclosure, showing coupling members that follow a concave curved profile, a convex curved profile, and a curved profile that has concave, convex and linear portions, respectively.
Figure 7B:
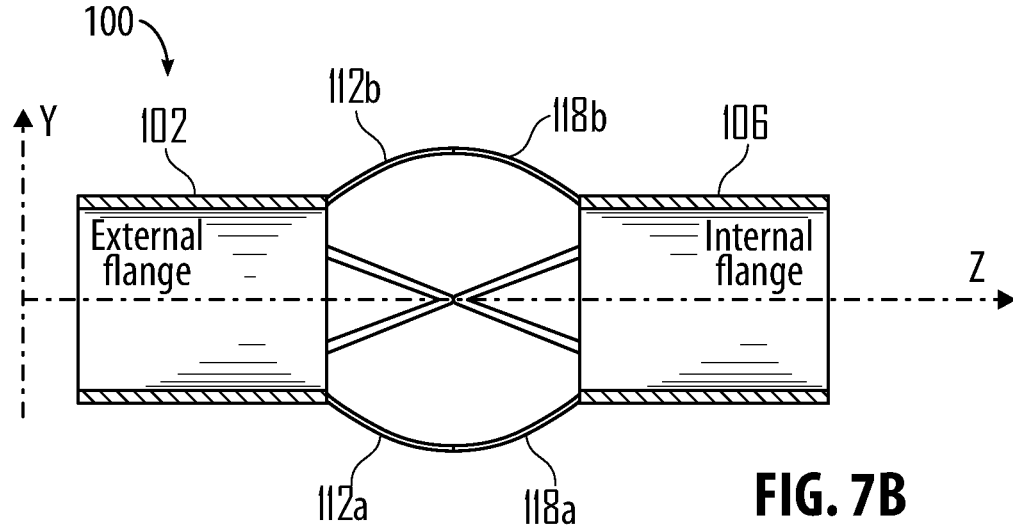
Figure 7C:
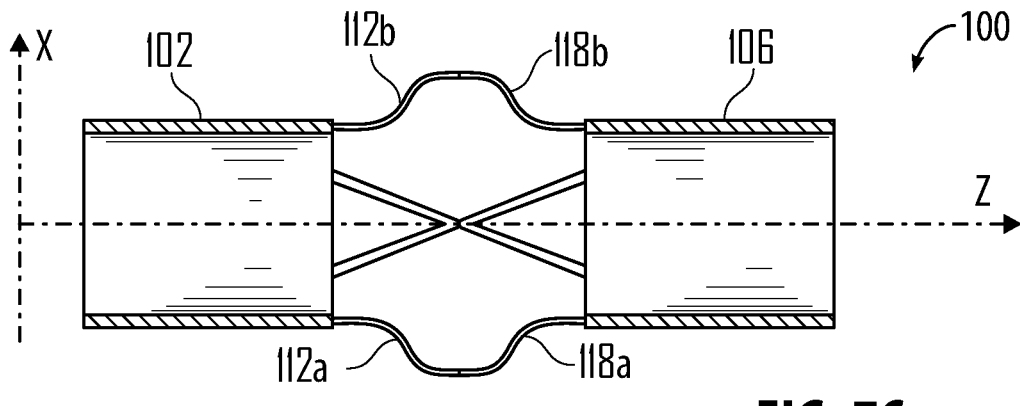
Figure 8A:
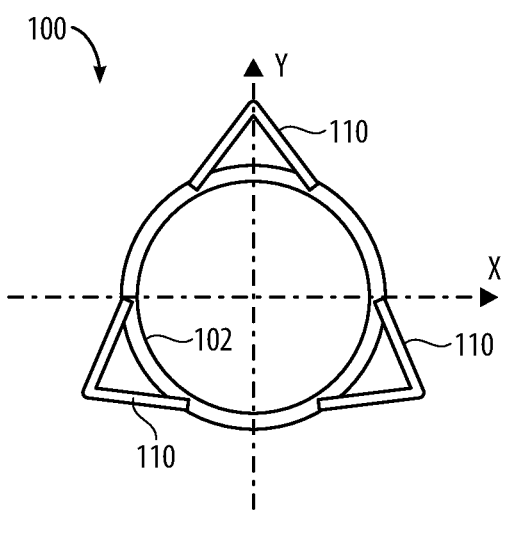
FIGS. 8A, 8B, 8C, and 8D are schematic diametrical end views of portions of flexible couplings as in FIG. 2C, showing configurations with three, four, six, and eight coupling members, respectively.
Figure 8B:
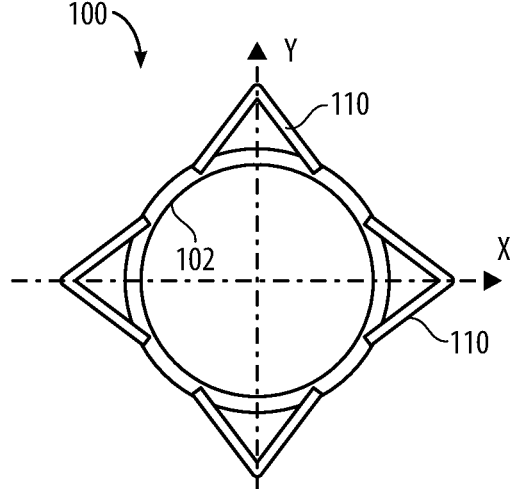
Figure 8C:
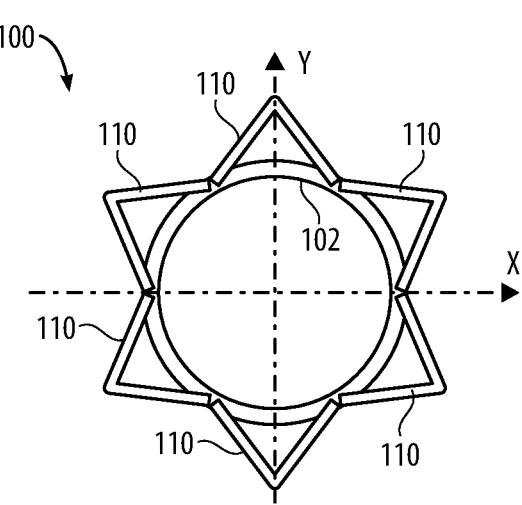
Figure 8D:
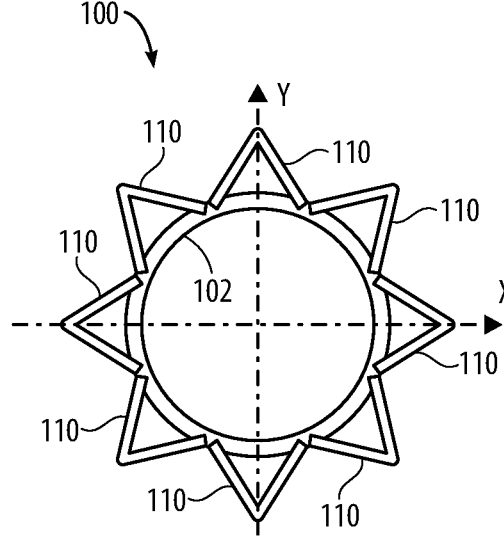

For the embodiment of FIG. 1, each of the beams 112*a*, 112*b*, 118*a*, 118*b* follows a straight line, i.e., the beams are each straight in the undeformed state. However, curved beams are also contemplated as shown in FIGS. 7A-7C. In FIG. 7A, each of the beams 112*a*, 112*b*, 118*a*, 118*b* follows a curved profile in the axial cross-section that is concave relative to the longitudinal axis Z. In FIG. 7B, each of the beams 112*a*, 112*b*, 118*a*, 118*b* beams follows a curved profile in the axial cross-section that is convex relative to the longitudinal axis Z. In FIG. 7C, each of the beams 112*a*, 112*b*, 118*a*, 118*b* follows a curved profile in the axial cross-section that includes any combination of concave portions, convex portions and linear portions relative to the longitudinal axis Z.

As shown in FIGS. 1-7, there are four coupling members 110, and their corresponding coupling members 116. However, any suitable number of coupling members 110, 116 can be used. FIGS. 8A, 8B, 8C, and 8D show examples with three, four, six, and eight coupling members 110, respectively. Those skilled in the art will readily appreciate that FIGS. 8A, 8B, 8C, and 8D can readily be applied for the same concept with the coupling members 116 of FIG. 1, and that any other suitable number of coupling members 110, 116 can be used without departing from the scope of this disclosure. The number of first coupling members 110 equals the number of second coupling members 116.

Figure 9A:
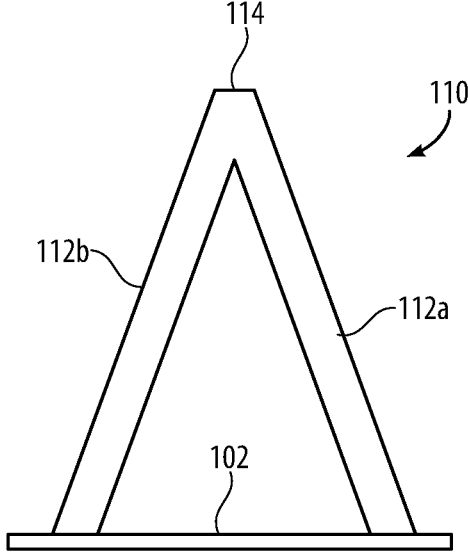
FIGS. 9A and 9B are schematic side elevation views of one of the coupling members of FIG. 1, showing coupling members with beams having a constant cross-section, and a non-constant cross-section, respectively.
Figure 9B:
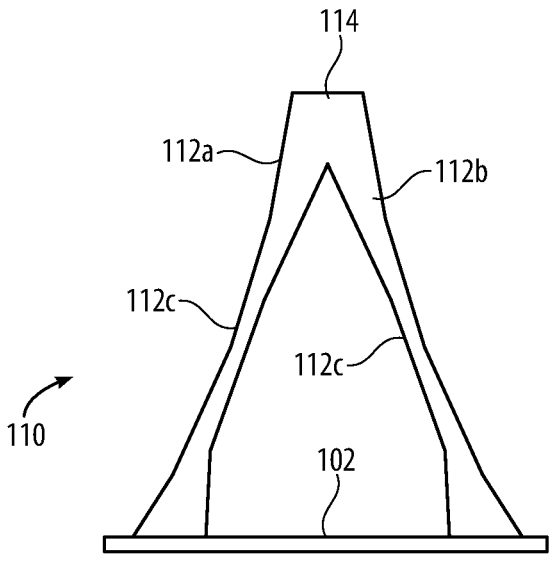

With respect now to FIGS. 9A and 9B, for the embodiments shown in FIGS. 1-8D, the beams 112*a*, 112*b*, 118*a*, 118*b* each have a constant cross-section along their lengths as shown in FIG. 9A. However, it is also contemplated the cross-sectional profile of the beams 112*a*, 112*b*, 118*a*, 118*b* can vary along their lengths, as shown in FIG. 9B, where the beams 112*a*, 112*b* are shown, as an example, with a converging-diverging cross-sectional profile with a narrow neck 112*c* in the middle. Non-uniformity of beam cross-sectional area and shape can be implemented by non-uniformity of width W or non-uniformity of thickness T or both.

Figure 10:
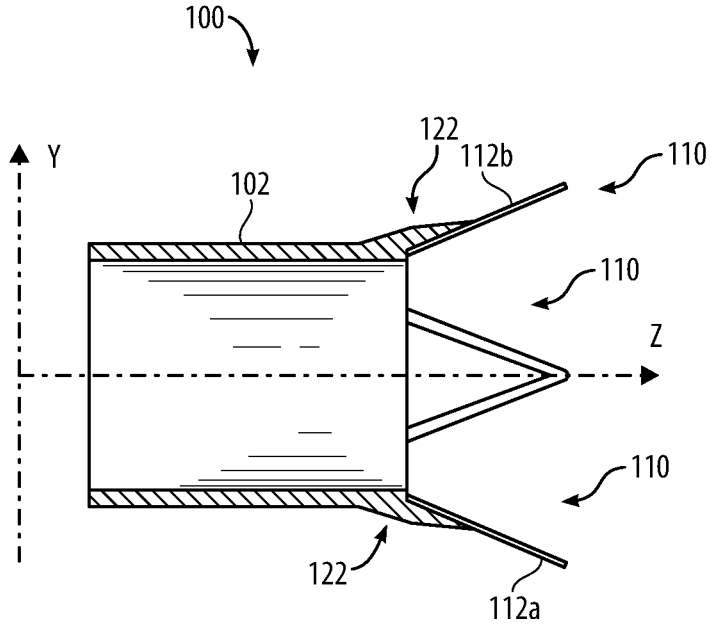
FIG. 10 is a schematic axial cross-sectional side elevation view of a portion of the flexible coupling as in FIG. 2A, showing reinforcement with non-uniform thickness for the coupling members.

With reference now to FIG. 10, each of the beams 112*a*, 112*b*, 118*a*, 118*b* is connected with a respective reinforcing member 122 to the first flange 102, two of which are visible in the cross-section of FIG. 10. Those skilled in the art will readily appreciate that the reinforcement members 122 shown applied to the beams 112*a*, 112*b* in FIG. 10 can readily be applied to the beams 118*a* and 118*b* of FIG. 1 as well.

Figure 11A:
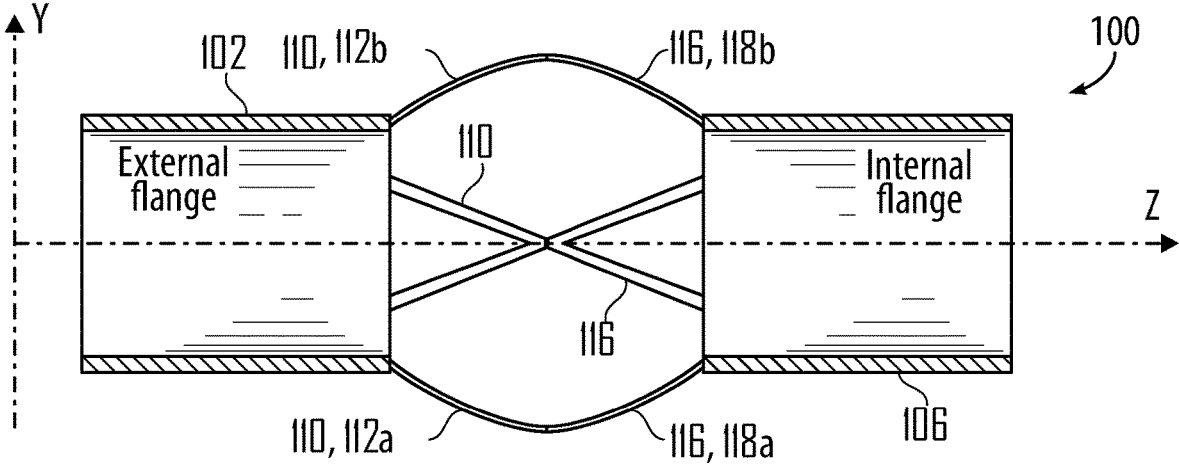
FIGS. 11A and 11B are schematic axial cross-sectional side elevation views of flexible couplings as in FIG. 1, with outward and inward extending curved coupling members, respectively.
Figure 11B:
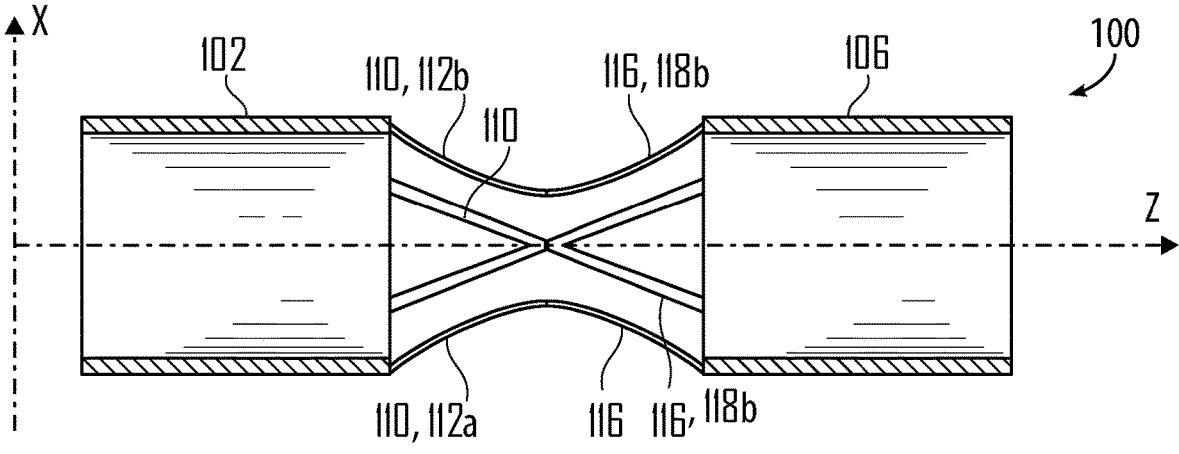

With reference now to FIGS. 11A and 11B, the embodiments shown in FIGS. 1-10 all have coupling members 110, 116 that extend radially outward beyond the radial extent of their respective flanges 102, 106 as shown in FIGS. 7A-7B. This is also shown in FIG. 11A, which is similar to FIG. 7B. However, as shown in FIG. 11B, it is also contemplated that the beams 112*a*, 112*b*, 118*a*, 118*b* can instead be configured to extend radially inward within an outer extent of the first and second flanges 102, 106 relative to the longitudinal axis Z.

With respect now to FIGS. 12A, 12B, and 12C, there are various branching configurations for how each beam 112*a*, 112*b*, 118*a*, 118*b* can connect to its respective flange 102, 106. In FIG. 12A, each beam 112*a*, 112*b*, just connects directly to its flange 102. However, in FIG. 12B, each beam 112*a*, 112*b*, connects to its flange 102 by way of a base of two respective branches 112*d*, 112*e*, 112*f*, 112*g*. Similarly, without numbering each branch to preserve clarity in the drawing, in FIG. 12C, each branch 112*d*, 112*e*, 112*f*, 112*g* has its own two branches connecting to the flange 102. Those skilled in the art will readily appreciate that the configurations in FIGS. 12B and 12C can readily be applied to the beams 118*a*, 118*b* of FIG. 1 as well. Topology of branching beam systems, shown in FIGS. 12B and 12C, are presented as representative demonstrations. Other, more complex topologies of branching beam systems can be similarly applied by those skilled in the art having had the benefit of this disclosure. Branching beams such as shown in FIGS. 12B and 12C can be produced by additive manufacturing.

Figures 13A, 13B, 13C, 13D:
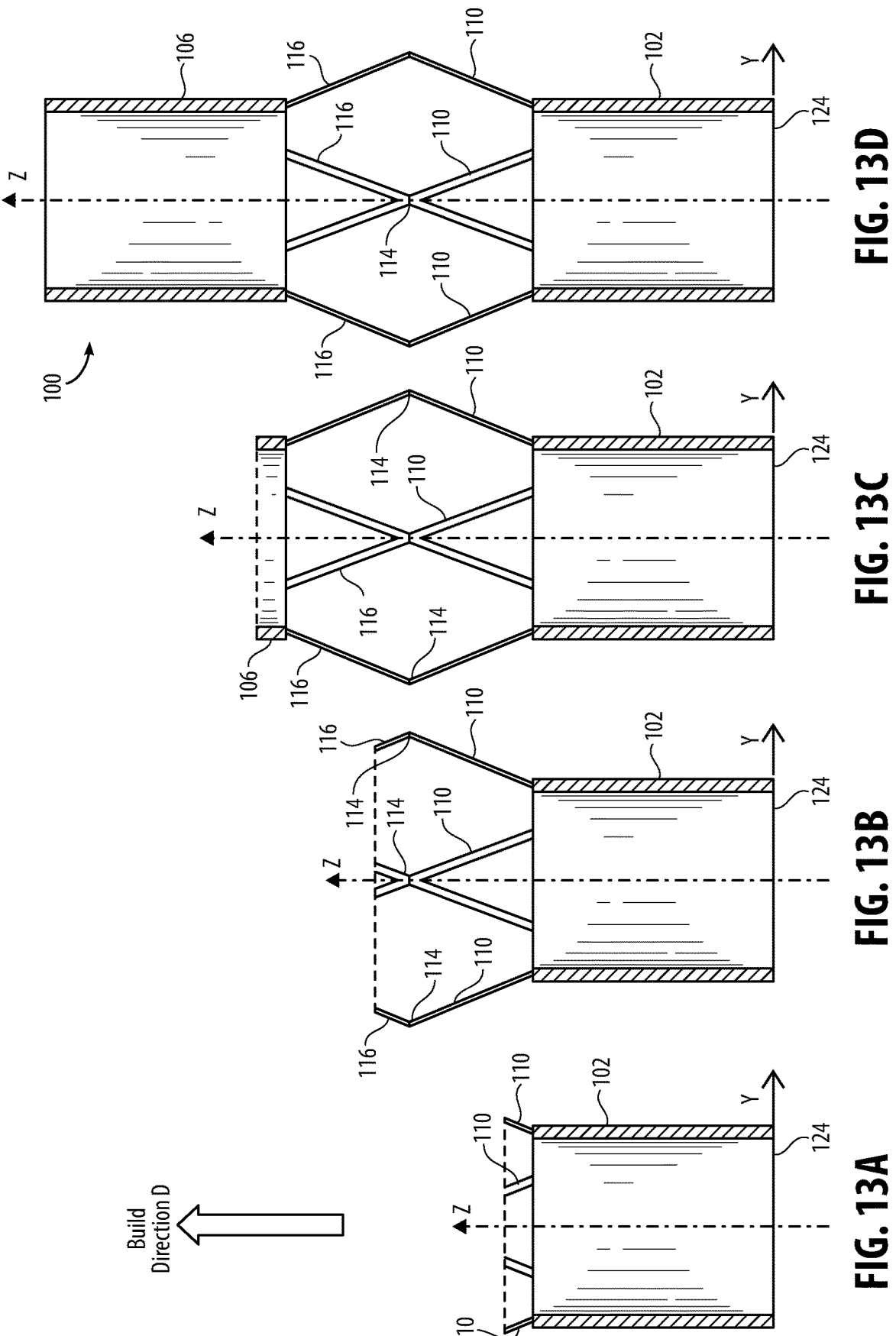
FIGS. 13A, 13B, 13C, and 13D are schematic axial side-elevation views of a flexible coupling as in FIG. 1, showing sequence of different respective stages during additive manufacturing of the flexible coupling.

With reference now to FIGS. 13A, 13B, 13C, and 13D, a method of making is provided herein for additively manufacturing any flexible coupling 100 as described above. As shown in FIG. 13A, the method includes forming the first flange 102 starting from a build plate 124 and proceeding in a layer-by-layer additive process in a build direction D away from the build plate 124, wherein the build direction D is aligned with the longitudinal axis Z. The method includes forming the plurality of first coupling members 110 starting from the first flange 102 and proceeding in a layer-by-layer additive process in the build direction D. As shown in FIG. 13B, after forming the plurality of first coupling members

110, the method includes forming the plurality of second coupling members 116, starting from the first nodes 114 and proceeding in a layer-by-layer process in the build direction D. After forming the plurality of second coupling members 116, as shown in FIG. 13C the method includes forming the second flange 106 beginning from the second coupling members 116 and proceeding in a layer-by-layer process in the build direction. After the final layer of the second flange 106 is formed, the flexible coupling 100 is complete, as shown in FIG. 13D. It is also contemplated that sub-parts of the build shown in FIGS. 13A, 13B, 13C, and 13D can be separately additively manufactured and then welded together, or the flexible coupling 100 can simply be built by welding. Although the build orientation D is aligned with the longitudinal axis Z in examples shown in FIG. 13, other build orientations can be applied if needed, for example, for manufacturing process optimization.

Systems and methods as disclosed herein can provide potential benefits including the following. The systems and methods herein can provide for less expensive metallic couplings for a broad range of aircraft drive shafts, relative to traditional configurations. Additionally, systems and methods as disclosed herein provide for use of newer fabrication technologies, such as additive manufacturing (AM) in the production of flexible couplings.

The methods and systems of the present disclosure, as described above and shown in the drawings, provide for flexibility in bending, compression, and tension for flexible couplings, while still providing stiffness in torsion. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A flexible coupling comprising:
a first flange of a first shaft;
a second flange of a second shaft, wherein the first flange and the second flange are cylindrical and wherein in a relaxed state the first flange and the second flange are aligned along a longitudinal axis;
a plurality of first coupling members extending from the first flange, wherein each first coupling member includes:
a first driving beam extending from the first flange; and
a second driving beam extending from the first flange and meeting the first driving beam at a first node to form a topologically triangular truss; and
a plurality of second coupling members extending from the second flange, wherein each second coupling member includes:
a first driven beam extending from the second flange; and
a second driven beam extending from the second flange and meeting the first driven beam at a second node to form a topologically triangular truss;
wherein the first node of each of the first coupling members is connected to the second node of a respective one of the second coupling members; and
wherein the first driving beams and second driving beams of the plurality of first coupling members, and the first driven beams and second driven beams of the plurality of second coupling members have variable cross-sectional profiles along their own respective lengths.

2. The flexible coupling as recited in claim 1,
wherein each of the first and second driven beams of the plurality of first coupling members has a width in a circumferential direction relative to the longitudinal axis,
wherein each of the first and second driven beams of the plurality of first coupling members has a thickness in a radial direction with respect to the longitudinal axis,
wherein each of the first and second driving beams of the plurality of second coupling members has the width in the circumferential direction,
wherein each of the first and second driving beams of the plurality of second coupling members has the thickness in the radial direction, and
wherein the width is greater than the thickness for flexibility under bending.

3. The flexible coupling as recited in claim 1, wherein each of the first driving beams and second driving beams of the plurality of first coupling members, and each of the first driven beams and second driven beams of the plurality of second coupling members extends radially outward beyond the first and second flanges relative to the longitudinal axis.

4. The flexible coupling as recited in claim 1, wherein each of the first driving beams and second driving beams of the plurality of first coupling members, and each of the first driven beams and second driven beams of the plurality of second coupling members extends radially inward within an outer extent of the first and second flanges relative to the longitudinal axis.

5. The flexible coupling as recited in claim 1, wherein there is no hoop member extending in a circumferential direction with respect to the longitudinal axis to connect the first nodes.

6. The flexible coupling as recited in claim 1, wherein the plurality of first coupling members includes three or more first couplings, wherein the plurality of second coupling members includes three or more second couplings, and wherein the number of first coupling members equals the number of second coupling members.

7. The flexible coupling as recited in claim 1, wherein each of the first driving beams and second driving beams of the plurality of first coupling members, and each of the first driven beams and second driven beams of the plurality of second coupling members follows a straight line.

8. The flexible coupling as recited in claim 1, wherein each of the first driving beams and second driving beams of the plurality of first coupling members, and each of the first driven beams and second driven beams of the plurality of second coupling members follows a curved profile that is concave relative to the longitudinal axis.

9. The flexible coupling as recited in claim 1, wherein each of the first driving beams and second driving beams of the plurality of first coupling members, and each of the first driven beams and second driven beams of the plurality of second coupling members follows a curved profile that is convex relative to the longitudinal axis.

10. The flexible coupling as recited in claim 1, wherein each of the first driving beams and second driving beams of the plurality of first coupling members, and each of the first driven beams and second driven beams of the plurality of first coupling members follows a profile that has any combination of concave, convex, or straight portions relative to the longitudinal axis.

11. The flexible coupling as recited in claim 1, wherein each of the first driving beams and second driving beams of the plurality of first coupling members, is connected with a respective reinforcing member to the first flange, and wherein each of the first driven beams and the second driven beams of the plurality of second coupling members is connected with a respective reinforcing member to the second flange.

12. The flexible coupling as recited in claim 1, wherein each of the first driving beams and second driving beams of the plurality of first coupling members connects to the first flange through a respective branching base, and wherein each of the first driven beams and second driven beams of the plurality of second coupling members connects to the second flange through a respective branching base.

13. A flexible coupling comprising:

a first flange of a first shaft;

a second flange of a second shaft, wherein the first flange and the second flange are cylindrical and wherein in a relaxed state the first flange and the second flange are aligned along a longitudinal axis;

a plurality of first coupling members extending from the first flange, wherein each first coupling member includes:

a first driving beam extending from the first flange; and a second driving beam extending from the first flange and meeting the first driving beam at a first node to form a topologically triangular truss; and a plurality of second coupling members extending from the second flange, wherein each second coupling member includes:

a first driven beam extending from the second flange; and a second driven beam extending from the second flange and meeting the first driven beam at a second node to form a topologically triangular truss;

wherein the first node of each of the first coupling members is connected to the second node of a respective one of the second coupling members; and wherein each of the first driving beams and second driving beams of the plurality of first coupling members connects to the first flange through a respective branching base, and wherein each of the first driven beams and second driven beams of the plurality of second coupling members connects to the second flange through a respective branching base.

14. The flexible coupling as recited in claim 13, wherein each of the first driving beams and second driving beams of the plurality of first coupling members, and each of the first driven beams and second driven beams of the plurality of second coupling members extends radially outward beyond the first and second flanges relative to the longitudinal axis.

15. The flexible coupling as recited in claim 13, wherein the plurality of first coupling members includes three or more first couplings, wherein the plurality of second coupling members includes three or more second couplings, and wherein the number of first coupling members equals the number of second coupling members.

16. The flexible coupling as recited in claim 13, wherein each of the first driving beams and second driving beams of the plurality of first coupling members, and each of the first driven beams and second driven beams of the plurality of second coupling members follows a curved profile that is concave relative to the longitudinal axis.

17. The flexible coupling as recited in claim 13, wherein each of the first driving beams and second driving beams of the plurality of first coupling members, and each of the first driven beams and second driven beams of the plurality of second coupling members follows a straight line.

18. The flexible coupling as recited in claim 13, wherein each of the first driving beams and second driving beams of the plurality of first coupling members, and each of the first driven beams and second driven beams of the plurality of second coupling members follows a curved profile that is convex relative to the longitudinal axis.

19. The flexible coupling as recited in claim 13, wherein each of the first driving beams and second driving beams of the plurality of first coupling members, and each of the first driven beams and second driven beams of the plurality of first coupling members follows a profile that has any combination of concave, convex, or straight portions relative to the longitudinal axis.

20. A method of additively manufacturing a flexible coupling, the method comprising:

forming a first flange of a first shaft starting from a build plate and proceeding in a layer-by-layer additive process in a build direction away from the build plate along the longitudinal axis;

after forming the first flange, forming a plurality of first coupling members starting from the first flange and proceeding in a layer-by-layer additive process in the build direction, wherein each first coupling member includes a first driving beam extending from the first flange and a second driving beam extending from the first flange and meeting the first driving beam at a first node to form a topologically triangular truss;

after forming the plurality of first coupling members, forming a plurality of second coupling members, starting from the first nodes and proceeding in a layer-by-layer process in the build direction; and after forming the plurality of second coupling members, forming a second flange beginning from the second coupling members and proceeding in a layer-by-layer process in the build direction;

wherein the first node of each of the first coupling members is connected to the second node of a respective one of the second coupling members and wherein each second coupling member includes a first driven beam extending from the second flange and a second driven beam extending from the second flange and meeting the first driven beam at a second node to form a topologically triangular truss.

* * * * *